United States Patent [19]

Pagane

[11] 4,292,620
[45] Sep. 29, 1981

[54] FUEL LEVEL MONITORING ENGINE CONTROL AND VEHICLE THEFT INHIBITING DEVICE

[76] Inventor: Warren H. Pagane, 16 Forbes Hill Rd., Wollaston, Mass. 02170

[21] Appl. No.: 48,025

[22] Filed: Jun. 13, 1979

[51] Int. Cl.³ .................... B60R 25/04; B60R 25/10
[52] U.S. Cl. .................................. 340/63; 180/287; 307/10 AT; 340/59
[58] Field of Search .............. 340/59, 63; 307/10 AT, 307/10 R; 180/287

[56] References Cited

U.S. PATENT DOCUMENTS

| | | | |
|---|---|---|---|
| 2,700,153 | 1/1955 | Huckabee | 340/59 |
| 3,886,518 | 5/1975 | Bozolan | 340/59 |
| 4,010,444 | 3/1977 | Shah | 340/63 |

Primary Examiner—Glen R. Swann

[57] ABSTRACT

An electronic fuel level monitoring, engine control and vehicle theft inhibition device which senses the voltage level from a fuel tank sender at the fuel gauge, providing initially an intermittent warning and later a shut-off of the engine ignition system when the voltage level indicates a predetermined low level of fuel. The ignition system is reactivated after refueling. Switching means provides a theft inhibition circuit by simulating a low fuel indication.

6 Claims, 4 Drawing Figures

FUEL LEVEL MONITORING ENGINE CONTROL AND VEHICLE THEFT INHIBITING DEVICE

BACKGROUND OF THE INVENTION

1. The Field of the Invention

This invention pertains to an Electronic Fuel Level Monitoring, Engine Control, and Vehicle Theft Inhibiting Device. It senses the fuel level in the fuel tank of an engine or a boiler, furnishing a warning signal when the level of fuel in the tank is low and completely shuts off the ignition system of the engine or boiler when the fuel level reaches a predetermined low level but before the tank is empty. The Vehicle Theft Inhibiting, Engine Control Device of this Invention, when activated in the Theft Inhibiting Position, furnishes both an alarm and prevents the engine from starting and the starter motor from cranking.

2. Description of the Prior Art

This application discloses an improved version of the Fuel Level Monitoring and Engine Control Device disclosed in U.S. pat. application Ser. No. 925,473, filed July 17, 1978 by the same inventor and now abandoned in favor of a continuation application, U.S. Ser. No. 063,276, filed Aug. 2, 1979.

Devices which sense the fuel level in a fuel tank are well known in the prior art. Examples are found in the fuel gauges of motor vehicles, aircraft, boats and often times on fuel tanks for boilers and heating systems. Many of these devices also include visible, audible or both visible and audible warning signals indicating a low fuel level. In these prior art devices however, if the tank is not resupplied with fuel, the fueled apparatus will simply stop when the fuel tank is empty. Allowing a fuel tank to become empty is not only an inconvenience, but also in some cases damaging to the equipment and in all cases expensive to remedy.

The problem of a fueled apparatus being forced to shut down by an empty fuel tank is particularly acute if the apparatus is off-the-road and/or construction equipment. Not only must the tank be refilled, but for heavy construction equipment a restart procedure is required which often times necessitates a mechanic being called to the site. After the tank is refueled, the engine must be primed, the fuel filter must be refilled and the engine cranked. In particular, diesel powered units are vulnerable to losing prime. The extensive cranking required in restarting also drains power from the battery, thus, shortening the starting life of the battery, depleting its charge and causing premature starter motor failure. The problems of restarting are particularly aggravated when environmental temperatures are at extremes (0° F. to 10° F. or 80° F. to 100° F.). Loss of productive time and cost of idled help are also problems.

A safety hazard may also be present when equipment shuts down inadvertently due to an empty fuel tank. At present, no known device provides an alarm before an impending failure coupled with an automatic shutoff before the fuel supply is exhausted.

If the equipment is being operated on a steep incline or near a cliff or hoisting a load when it runs out of fuel, the operator can lose control and be unable to stop since inertia could cause it to continue to move even when unpowered. Loss of power steering and power brakes can occur. Accidents can and do happen under such circumstances.

Devices which inhibit theft are well known in the prior art. Examples are found in some original equipment for automobiles and retro-fit equipment for trucks, boats, and some passenger cars. Many of these devices also include visible and/or audible warning signals indicating unauthorized entry or use of the vehicle. If the vehicle does not have a theft inhibiting device, it is a relatively simple operation, even though the vehicle is locked, to misappropriate and/or start the vehicle without authorization.

Having a vehicle misappropriated is costly, inconvenient, dangerous and conducive to further criminal activity.

Vehicle theft deterrents are well known in the prior art. Examples are:

1. devices controlling the locking of the automobile hood and ignition shutdown.
2. an alarm system actuated by the opening of a hood, trunk, or door.
3. an ignition deactivating system through the separation of a plug device which prevents the engine from starting.

In the present device, there is not only an alarm but an engine shutdown combination that is activated by one switch in conjunction with the Fuel Level Monitoring and Engine Control Device. The combination furnishes far more protection against the theft of a vehicle in a more efficient and far less expensive operation.

A search of the prior patent art and an extensive search through trade sources fail to disclose any prior art device which will solve the problems discussed. The present invention is specifically designed to solve these problems.

SUMMARY OF THE INVENTION

The present invention is an electronic fuel level monitoring, engine control, and vehicle theft inhibiting device which completely shuts off the ignition system of a liquid or gas fueled vehicle or boiler when the fuel in the tank reaches a predetermined low level. It can operate with any fueled apparatus regardless of the type of liquid or gaseous fuel used, whether it be gasoline, diesel, propane or other type of liquid or gaseous fuel. The device of this invention continually senses the level of fuel in the tank. As this level becomes low it gives a warning signal which may be visible or audible or both. This warning signal can be set to have a predetermined time delay, before the device will shut down the ignition system of the unit. The purpose of the time delay is to allow the operator time to position the unit properly for refueling.

The delay allows the operator to move to a fuel supply island, or to a safe place, to refuel outdoors such as away from open flame, to a no smoking area, and so forth. It also allows the operator time to raise or lower the unit's equipment or load to a safe level. It allows him time to leave a railroad box car he may be unloading, leave a steep incline, leave railroad tracks, or a roadway. Thus the device of the present invention can be used with home or industrial heating units, large fuel storage tanks and airport refueling systems. It can also be coupled with an automatic dialing system or radio beeper system whereby the warning signal triggers a call to a fuel supplier. The use of a fixed delay can eliminate tampering with the system.

When the device senses a predetermined but safe low fuel level, for example one-eighth or one-quarter of a tank capacity, the device will automatically shut the unit down and deactivate the ignition and starter systems. The shutdown can be linked with a visible or audible signal. Furthermore, the device of this invention will not reactivate the ignition system until the tank contains greater than a predetermined amount of fuel, thus eliminating repetitive and unnecessary refueling during daily operation of the unit. After the unit is refueled beyond the predetermined upper level, the ignition system is reactivated and the unit is ready to operate. Thus, the device of this invention eliminates priming the engine, filling the filters, long cranking periods and lost operating time and labor. It further eliminates the electrical problems caused when the ignition switch is on and the unit is inoperative due to an empty fuel tank. Also the safety hazards mentioned previously are eliminated. Furthermore, the fuel level monitoring and engine control device of this Invention, can be fitted with a lock-out that can only be reset with a key to indicate which units are continuously having fuel problems.

The fuel level monitoring and engine control portion of the device of the present invention contains a single voltage level sensor. The fuel level signal is applied to the voltage sensor either directly from a fuel gauge system of one type or through a voltage level shifter for other fuel systems. This approach allows a single voltage level sensor with fixed trip points to be compatible with all known fuel gauge systems in use. The output signal of the voltage level sensor is fed either directly for low fuel with low voltage or through an inverter for low fuel with higher voltage to a time delay circuit and a gated oscillator. When the input signal to the time delay circuit changes state to the low fuel condition, the time delay circuit is activated and begins its timing function. Simultaneously, the gated oscillator is enabled and provides a pulsating signal to both an internal audible alarm and a lamp driver capable of operating an external visual alarm. When the time delay circuit has reached its predetermined delay time, a signal is applied to a relay driver which deenergizes the output relay which in turn deactivates the engine ignition system and activates optional external alarms. At the same time, the output signal from the time delay circuit at the termination of the predetermined time delay is used to change the pulsating signal to the internal audible alarm and external visual alarm to a constant signal, thereby providing a positive indication that the engine cannot be restarted without the addition of a sufficient amount of fuel. The engine is now disabled and cannot be restarted through any possible combination of manipulations of ignition and starter switches. Any attempt to restart the engine will always result in a steady alarm condition of both the audible and visible alarms. In addition, the starter circuit will be disabled thereby eliminating the possibility of applying unnecessary stress to the battery or the starter motor during attempts to start the engine with an insufficient fuel supply.

When a sufficient amount of fuel has been added to change the state of the input signal to the time delay circuit to a high fuel condition, the time delay is reset thereby re-energizing the output relay causing the ignition and starter circuits to revert to their active state while resetting all external alarms controlled by the output relay. Simultaneously, the gated oscillator is disabled thereby deactivating all low fuel warning alarms. In addition to the operating sequences described above, the fuel level monitoring, engine control and vehicle theft inhibiting device contains an integral self-test feature which is activated by application of power to the unit (closing of the ignition switch). When the ignition switch is first closed during the starting procedure of a vehicle, the self-test circuit activates and maintains an output relay in the de-energized state for approximately one second. At the same time, all internal and external alarms, with the exception of the theft inhibiting alarm are activated during the one second self-test interval, thereby providing a positive indication to the operator that the fuel level monitoring, engine control, and vehicle theft inhibiting device is functioning. At the end of the one second test interval, the device reverts to a normal operating state. All operating power for the fuel level monitoring, engine control, and vehicle theft inhibiting device is derived from the engine starting battery. Internal power supply voltage for the electronic circuits is regulated to provide operating parameters independent of actual battery voltage. In addition, protection circuits are provided for both reverse polarity protection and transient voltage normally encountered in an automotive environment.

In the vehicle theft inhibiting portion of the device of this invention, there is coupled with the fuel level monitoring and engine control electronics, a circuit wired through a control switch which will activate the same circuit that is activated in a low fuel condition. Thus by activating the vehicle theft inhibiting switch, the device electronically simulates a low fuel condition enabling an audible alarm and deactivating the starter and ignition circuit of the vehicle. This theft circuit will work with fuel gauge circuits in which either high voltage indicates low fuel or low voltage indicates low fuel.

Furthermore, the fuel level monitoring, engine control, and vehicle theft inhibiting device, when installed, does not affect either the safety or the operating efficiency of the original equipment. The device is a practical working instrument, which can be produced at a reasonable cost and attached to any piece of liquid or gaseous fueled equipment without affecting the power source.

DESCRIPTION OF THE PREFERRED EMBODIMENT

Figure 1:
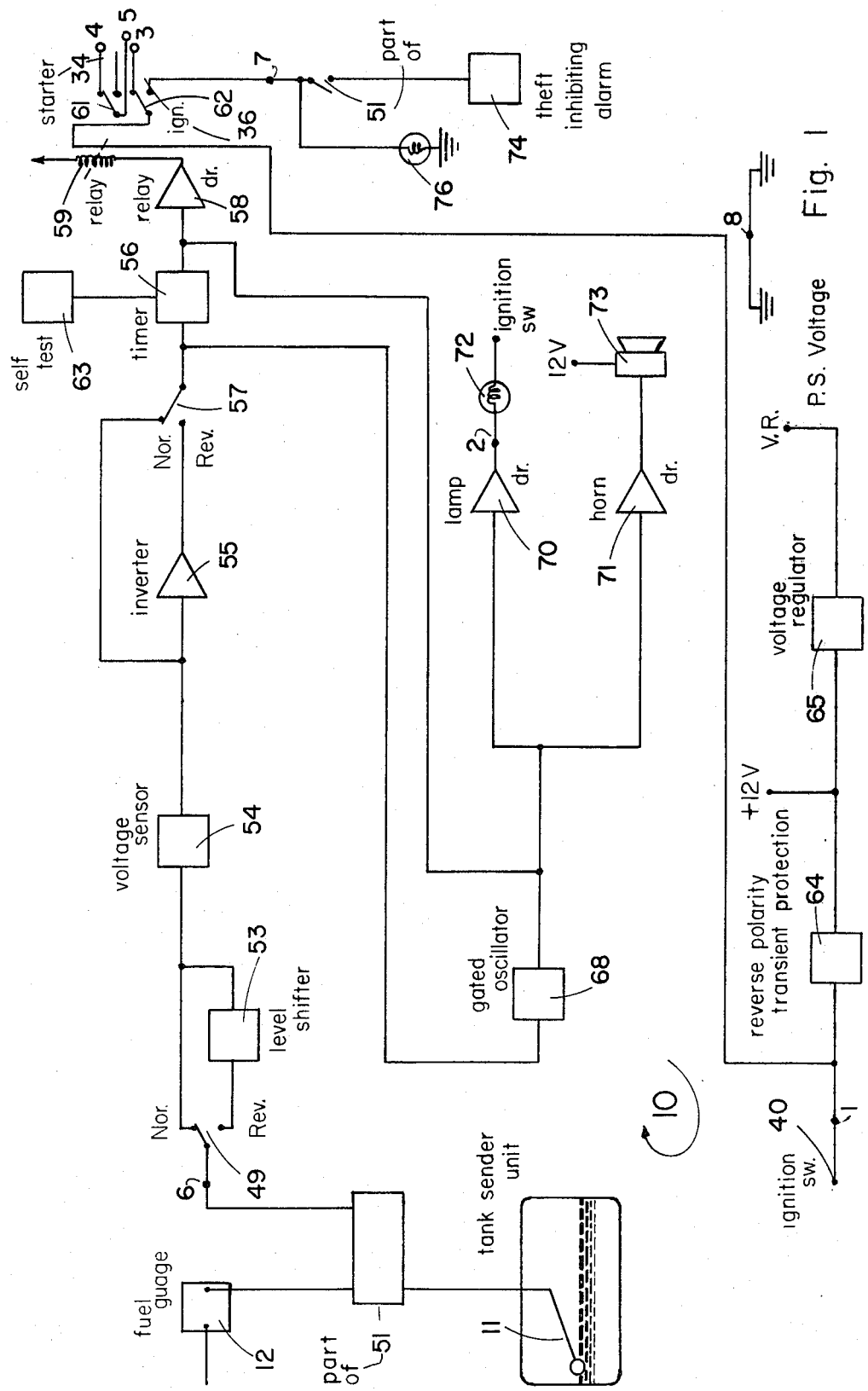
FIG. 1 is a schematic diagram of the electrical circuit for the fuel level monitoring, engine control and vehicle theft inhibition device of the present invention.

Referring to the drawings, the preferred embodiment of the fuel level monitoring, engine control and vehicle theft inhibiting device of the present invention is illustrated in FIG. 1, and is designated generally by the reference number 10. Device 10 is wired to the fuel gauge 12 of an engine fuel tank, from which the fuel level signal is applied to a voltage sensor 54, either directly through switch 49 for fuel gauge systems reading a low fuel level with a low voltage (type N) or through switch 49 to a voltage level shifter 53 for fuel systems reading a low fuel level with a high voltage (type R). Device 10 allows a single voltage level sensor 54 with fixed trip points to be compatible with all known fuel gauge systems in use.

The output signal of the voltage level sensor 54 is fed either directly through switch 57 (N) or through an inverter 55 and switch 57 (low fuel with high voltage) (R) to a time delay circuit 56 and a gated oscillator 68.

When the output signal to the time delay circuit 56 changes state to a low fuel condition, the time delay cicuit 56 is activated and begins its timing function. Simultaneously, the gated oscillator 68 is enabled and provides a pulsating signal to the audible alarm driver 71 with audible alarm 73 and the visual alarm driver 70 and visual indicator 72.

When the time delay circuit 56 has reached its predetermined delay time, a signal is applied to a relay driver 58 which de-energizes the output relay 59 which, in turn, through relay contacts 61 for the starter and 62 for the ignition, deactivates the engine ignition system 36, starter circuit 34 and activates optional external alarms 76 or circuit 74. Simultaneously, the output signal from the time delay circuit 56, at the termination of the predetermined time delay, is used to change the pulsating signal to the internal audible alarm 73 and external visual alarm 72 to a constant signal, thereby providing a positive indication that the engine cannot be restarted without addition of a sufficient amount of fuel. One embodiment of the time delay circuit 56 is disclosed in the aforementioned U.S. Ser. No. 925,473 and now pending U.S. Ser. No. 063,276. Therein it describes a counter which is connected to the oscillator, herein reference numeral 68, to count the cycles of the latter. Typically the oscillator operates at two cycles per second. After the predetermined time delay, usually five minutes for heavy off-the-road equipment, a signal is applied from the counter to the relay driver 58, resulting in de-energization of relay 59. There is further described an arrangement wherein the output of the counter portion of the timing means is fed back to the output of the gated oscillator. After the predetermined time delay, the signal at the output of the counter latches the output signal from the gated oscillator and causes the warning signals, visual and audible, to operate on a continuous basis.

The engine is now disabled and cannot be restarted through any possible combination or manipulation of the ignition or starter switches. Any attempt to restart the engine will always result in a steady alarm condition for both the audible and visual alarms 73, 72. In addition the starter circuit 34 will be disabled, thereby eliminating the possibility of applying unnecessary stress to the battery or starter motor during attempts to start the engine with insufficient fuel supply.

When a sufficient amount of fuel has been added to change the state of the input signal to the time delay circuit 56 to a high fuel condition, the time delay circuit 56 is reset, thereby re-energizing the output relay 59, causing the ignition and starter contacts 62, 61 to revert to their active or closed state, completing circuits to the starter and ignition 34, 36 while resetting all external alarms controlled by output relay 59.

Simultaneously, the gated oscillator 68 is disabled, thereby deactivating the low fuel warning alarms 72, 73.

In addition to the operating sequence described above, the device 10, fuel level monitoring, engine control and vehicle theft inhibiting device, contains an integral self-test feature which is activated by application of power to the unit, through closing of ignition switch 40. When the ignition switch 40 is first closed during the starting procedure of a vehicle, the self-test circuit 63 activates and maintains the output relay 59 in the de-energized state for approximately one second. Simultaneously all internal and external alarms 73, 72, 76 are activated during that one second self-test interval, thereby providing a positive indication to the operator that the fuel level monitoring, engine control and vehicle theft inhibiting device 10 is functioning. At the end of the one second self-test interval, device 10 reverts all circuits to normal operating conditions relative to existing fuel level.

Figure 2:
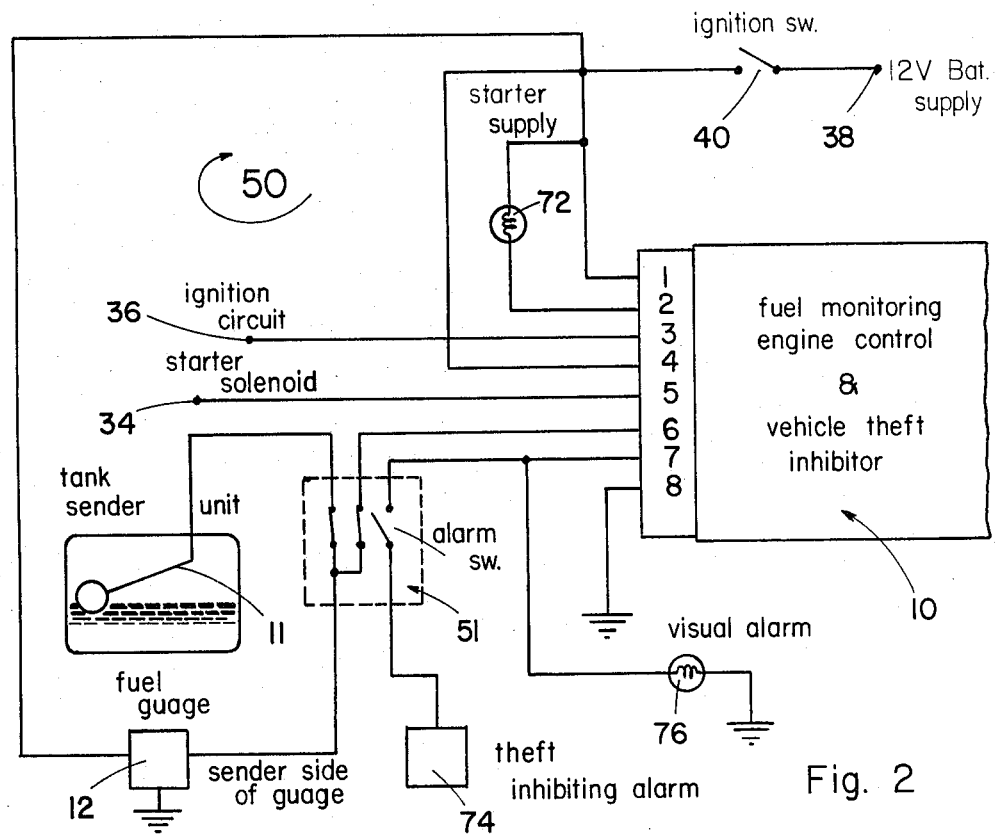
FIG. 2 is a schematic diagram of the connections of the circuit of FIG. 1 to a vehicle electrical circuit.

Also included in FIG. 2 is the circuit which incorporates the vehicle theft inhibiting portion of the device 10. Switch 51 as shown in FIG. 2 illustrates the switch positions for the normal operating mode, i.e. when not performing the theft inhibiting function.

As illustrated, the theft inhibiting function can be implemented by three independent switch poles connected to the circuitry, gauge-sender unit and theft alarm.

Figure 2A:
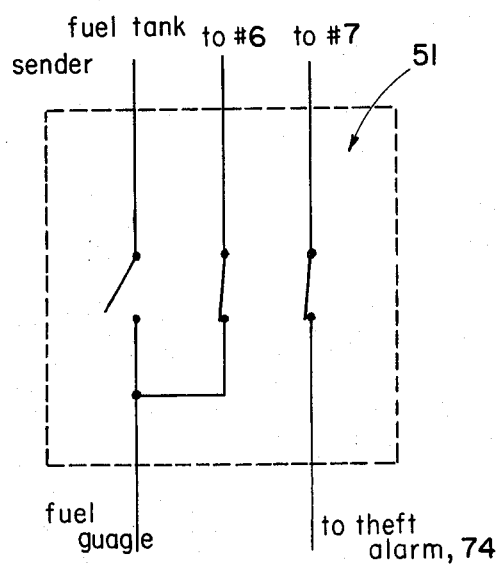
FIGS. 2a and 2b show alternate wiring positions of a switch in the circuit of FIG. 2.

FIG. 2A is an illustration of the switch positions for the type of fuel gauge-fuel sender circuit which exhibits a high voltage for a low fuel condition. Such a circuit is manufactured, for example, by Stewart-Warner Corporation of Chicago, Illinois.

In this configuration the right hand pole of 2A is closed connecting terminal 7 of the circuitry to the theft inhibiting alarm 74. Left hand pole of 2A is open interrupting the normal connection between the fuel gauge and the fuel tank sender unit. With this interruption, the voltage at the fuel gauge side of the left hand pole of 2A is essentially at the battery voltage.

The center pole of 2A is connected between terminal 6, or the input to the fuel monitoring circuitry, and the fuel gauge side of 2A. Therefore, when the left pole of 2A is open, the input to the circuitry sees, essentially, the battery voltage. Since for this type system a high voltage indicates a low fuel condition, the setting of the poles of 2A, as indicated, simulate this situation once the ignition switch 40 is closed. As before, for a low fuel condition, the ignition and starting circuits would be deactivated, and the theft inhibiting alarm 74 activated. The circuit will remain in this state until the ignition switch 40 is turned off. To disarm the alarm system, the right hand pole of 2A is opened. Thereafter, to resume normal mode, left hand pole of 2A is closed and the center pole of 2A remains in the closed position.

Figure 2B:
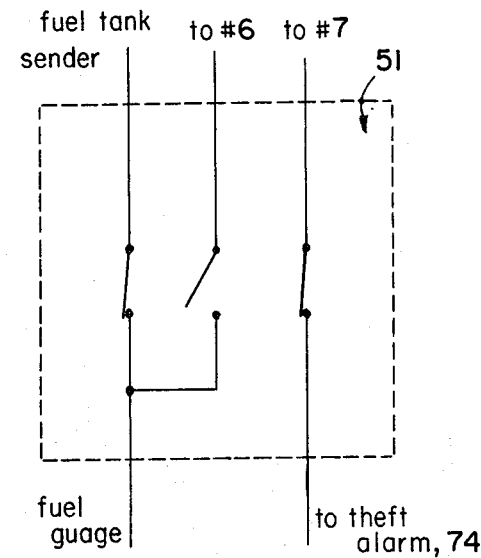

FIG. 2B is an illustration of the switch positions for the type of fuel gauge-fuel sender circuit which exhibits a low voltage for a low fuel condition. Such a circuit is manufactured, for example, by the A.C. Spark Plug Division of General Motors Corporation, Flint, Michigan.

In this configuration, again, the right hand pole of 2B is closed. As before, this connects terminal 7 of the circuitry to the theft inhibiting alarm 74. In this arrangement, the left pole of 2B is closed. The center pole of 2B, however, is opened. The opened center pole of 2B results in zero volts appearing at the input terminal 6 to the circuitry.

Since for this type system, a low voltage would indicate a low fuel condition, with the switch set as indicated, such a low fuel situation would be simulated once the ignition switch 40 is closed. As before, for a low fuel condition, the ignition and starting circuits would be deactivated while the theft inhibiting alarm 74 was set off. The circuit will remain in this state until the ignition switch 40 is turned off (opened). To disarm the alarm system the right hand pole of 2B would likewise be opened. To return to the normal fuel monitoring hookup, the center pole of 2B would likewise have to be closed.

I claim:

1. A fuel level monitoring, engine control and theft inhibition device for use with an engine having an electrical ignition system including an electrical ignition switch, a starter system, a fuel supply tank and an electrically operated fuel gauge system including a fuel sending unit and a fuel gauge interconnected electrically to the electrical ignition system, whereby a first signal voltage is generated to indicate the quantity of fuel in said fuel tank, said device serving to shut down the engine when the fuel supply in said tank reaches a predetermined low level but before said fuel supply is exhausted and to prevent said engine from being started by unauthorized persons, said device comprising:

voltage sensing means connected to the junction of the fuel sending unit and the fuel gauge of said electrically operated fuel gauge system, which voltage sensing means changes state when the first signal voltage reaches a predetermined value indicating a low level of fuel in said supply tank;

a gated oscillator connected to said voltage sensing means, said gated oscillator being enabled when voltage sensing means changes to a state indicating low fuel level, such that said oscillator operates at a predetermined frequency when enabled;

a warning means connected to and activated by said oscillator, such that said warning means provides an intermittent warning;

a relay including contacts connected electrically to the ignition system of said engine;

timing means including a counter connected to said oscillator to count cycles from said oscillator, such that after a predetermined number of cycles said counter de-energizes said relay and when said relay is de-energized said relay turns off said ignition system before said fuel supply is exhausted, said counter being further connected electrically to said warning means by a feedback loop such that when said counter has reached a predetermined count, said warning means operates continuously;

switching means connected to said voltage sensing means, said warning means and said ignition system such that when said switching means is activated, the activation of said ignition system results in a simulation of a fuel condition below the predetermined low level such that said voltage sensing means changes state as indicated above thereby deactivating the ignition system of said engine.

2. The device of claim 1 wherein said voltage sensing means includes means to sense a low voltage indicating a low fuel supply.

3. The device of claim 1 wherein said voltage sensing means includes means to sense a high voltage indicating a low fuel supply.

4. The device of claim 1 wherein said warning signal is an audible signal.

5. The device of claim 1 wherein said warning signal is a visual signal.

6. The device of claim 1 wherein said relay includes contacts connected electrically to the starter system of said engine whereby the starter system is deactivated when said ignition system is deactivated.

* * * * *